United States Patent
Lee et al.

(10) Patent No.: US 9,423,907 B2
(45) Date of Patent: Aug. 23, 2016

(54) DISPLAY DEVICE WITH INTEGRATED TOUCH SCREEN AND A METHOD OF DRIVING THE SAME

(71) Applicant: LG DISPLAY CO., LTD., Seoul (KR)

(72) Inventors: Young Joon Lee, Goyang-si (KR); Sun Yeop Kim, Seoul (KR); Sung Yub Lee, Busan (KR)

(73) Assignee: LG DISPLAY CO., LTD., Seoul (KR)

( * ) Notice: Subject to any disclaimer, the term of this patent is extended or adjusted under 35 U.S.C. 154(b) by 320 days.

(21) Appl. No.: 14/025,419

(22) Filed: Sep. 12, 2013

(65) Prior Publication Data

US 2014/0184534 A1    Jul. 3, 2014

(30) Foreign Application Priority Data

Dec. 31, 2012   (KR) .................. 10-2012-0158544

(51) Int. Cl.
*G06F 3/041*    (2006.01)
*G06F 3/044*    (2006.01)

(52) U.S. Cl.
CPC ............. *G06F 3/0416* (2013.01); *G06F 3/044* (2013.01); *G06F 3/0412* (2013.01)

(58) Field of Classification Search
CPC ......... G06F 3/044; G06F 3/412; G06F 3/416
USPC ................................................. 345/173–179
See application file for complete search history.

(56) References Cited

U.S. PATENT DOCUMENTS

| | | | |
|---|---|---|---|
| 7,859,521 B2 | 12/2010 | Hotelling et al. | |
| 8,654,083 B2 * | 2/2014 | Hotelling ............ | G02F 1/13338 345/173 |
| 8,780,065 B2 * | 7/2014 | Ribeiro ................ | G06F 3/0412 345/173 |
| 8,952,913 B2 * | 2/2015 | Lee ....................... | G06F 3/0416 345/173 |
| 2005/0146486 A1 * | 7/2005 | Lim ..................... | G09G 3/3611 345/1.1 |
| 2008/0048994 A1 * | 2/2008 | Lee ........................ | G06F 3/044 345/173 |
| 2010/0194707 A1 | 8/2010 | Hotelling et al. | |
| 2011/0242050 A1 | 10/2011 | Byun et al. | |
| 2012/0162584 A1 * | 6/2012 | Chang ................... | G06F 3/0412 349/106 |
| 2012/0169648 A1 | 7/2012 | Luo | |
| 2012/0242597 A1 * | 9/2012 | Hwang ................. | G06F 3/0412 345/173 |
| 2013/0147724 A1 * | 6/2013 | Hwang ................. | G06F 3/0412 345/173 |
| 2013/0241868 A1 * | 9/2013 | Kim ..................... | G09G 3/3685 345/174 |
| 2013/0335342 A1 * | 12/2013 | Kim ....................... | G06F 3/044 345/173 |

(Continued)

FOREIGN PATENT DOCUMENTS

EP    2 503 435 A2    9/2012
JP    2011-222013 A    11/2011

*Primary Examiner* — Temesgh Ghebretinsae
*Assistant Examiner* — Benyam Ketema
(74) *Attorney, Agent, or Firm* — Birch, Stewart, Kolasch & Birch, LLP

(57) ABSTRACT

Discussed is a display device with integrated touch screen and a method of driving the same. The display device includes a panel including a plurality of driving electrodes and a plurality of sensing electrodes, a touch IC, and a display driver IC. The touch IC generates a first driving pulse, and determines whether there is a touch using a plurality of sensing signals generated by the sensing electrodes. When the panel operates a touch driving mode, the display driver IC generates a second driving pulse with the first driving pulse to apply the second driving pulse to the driving electrodes and receives the sensing signals from the respective sensing electrodes to transfer the sensing signals to the touch IC.

8 Claims, 6 Drawing Sheets

(56) References Cited

U.S. PATENT DOCUMENTS

2013/0335366 A1* 12/2013 Lee .................. G06F 3/044
  345/174
2013/0342479 A1* 12/2013 Pyo .................. G09G 3/00
  345/173
2014/0028616 A1* 1/2014 Furutani ............ G06F 3/044
  345/174
2014/0078097 A1* 3/2014 Shepelev ........... G06F 3/044
  345/174
2014/0111446 A1* 4/2014 Lee .................. G06F 3/0416
  345/173

* cited by examiner

DISPLAY DEVICE WITH INTEGRATED TOUCH SCREEN AND A METHOD OF DRIVING THE SAME

CROSS-REFERENCE TO RELATED APPLICATIONS

This application claims the benefit of the Korean Patent Application No. 10-2012-0158544 filed on Dec. 31, 2012, which is hereby incorporated by reference as if fully set forth herein.

BACKGROUND

1. Field of the Invention

The present invention relates to a display device, and more particularly, to a display device with integrated in-cell type touch screen.

2. Discussion of the Related Art

Touch screens are a type of input device that is included in display devices such as Liquid Crystal Displays (LCDs), Field Emission Displays (FEDs), Plasma Display Panels (PDPs), Electroluminescent Displays (ELDs), and Electrophoretic Displays (EPDs), and enables a user to input information by directly touching a screen with a finger, a pen or the like while looking at the screen of the display device.

Particularly, the demand of display devices with integrated in-cell type touch screen, which include a plurality of built-in elements configuring the touch screen for slimming portable terminals such as smart phones and tablet Personal Computers (PCs), is recently increasing.

In a related art display device with integrated in-cell type touch screen disclosed in U.S. Pat. No. 7,859,521, a plurality of common electrodes for display are segmented into a plurality of touch driving areas and touch sensing areas, thereby allowing a mutual capacitance to be generated between the touch driving area and the touch sensing area. Therefore, the related art display device measures the change of a mutual capacitance that occurs in touch, and thus determines whether there is a touch.

In other words, in the related art display device with integrated in-cell type touch screen, a plurality of common electrodes for display perform the function of a touch electrode when a panel operates in a touch driving mode, for simultaneously performing a display function and a touch function.

In a related art in-cell type mutual capacitive touch screen using the existing common electrodes, a scheme that uses a plurality of driving electrodes and sensing electrodes necessary for touch driving temporally separates a display driving mode section and a touch driving mode section by using a common electrode, and thus prevents a noise ingredient (which occurs in the display driving mode section) from affecting the touch driving.

In the display driving mode section, a driving electrode and a sensing electrode act as common electrodes, and thus, a common voltage is applied to the driving electrode and the sensing electrode. Also, in the touch driving mode section, since the driving electrode and the sensing electrode act as touch electrodes, an alternating current (AC) voltage having a periodic driving pulse type is applied to the driving electrode, and a direct current (DC) voltage is applied to a touch IC in order for the touch IC to determine whether there is a touch by using a touch sensing signal which is generated between the driving electrode and the sensing electrode by a driving pulse.

FIG. 1 is a timing chart showing voltages which are respectively applied to a driving electrode and sensing electrode of a related art display device with integrated touch screen.

For example, as shown in FIG. 1, in a display driving mode section, a common voltage Z(V) is applied to both the driving electrode TX and the sensing electrode RX, and thus an equal voltage is generated between the driving electrode and the sensing electrode.

However, in a panel, the size and direction of the driving electrode differ from those of the sensing electrode, and thus, when the same common voltage is applied to the two electrodes in the display driving mode section, different influences are exerted on the driving electrode and the sensing electrode in a pixel charging/discharging operation performed by the turn-on/off of a switching transistor, causing a difference between voltages applied to liquid crystal.

As a result, in the display driving mode section, block dim is caused by a luminance difference between a driving electrode block and a sensing electrode block that are used as common electrodes.

Moreover, as shown in FIG. 1, in a touch driving mode section, a driving pulse that has X(V) as a high-level voltage VTX_HIGH and has a ground voltage as a low-level voltage VTX_LOW is applied to the driving electrode TX, and a touch sensing reference voltage VRX_REF of Y(V) that is a constant DC voltage is applied to a receiver of a touch IC connected to the sensing electrode RX.

Here, as shown in FIG. 1, the driving pulse is applied to the driving electrode in only some sections, and the ground voltage that is a low-level voltage is applied to the driving electrode in most sections.

Therefore, a difference between voltages respectively applied to the driving electrode and the sensing electrode occurs in the touch driving mode section, and thus, different voltages are applied to the driving electrode block and the sensing electrode block that are used as touch electrodes in the touch driving mode section, causing block dim due to a luminance difference between blocks similarly to the display driving mode section.

SUMMARY

Accordingly, the present invention is directed to provide a display device with integrated in-cell type touch screen that substantially obviates one or more problems due to limitations and disadvantages of the related art.

An aspect of the present invention is directed to provide a display device with integrated touch screen for preventing block dim caused by a difference between voltages respectively applied to a driving electrode and a sensing electrode.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a display device with integrated touch screen including: a panel including a plurality of driving electrodes and a plurality of sensing electrodes; a touch IC generating a first driving pulse, and determining whether there is a touch by using a plurality of sensing signals generated by the respective sensing electrodes; and a display driver IC applying a first common voltage to the driving electrodes and applying a second common voltage different from the first common voltage to the sensing electrodes when the panel operates a display driving mode and, when the panel operates a touch driving mode, generating a second driving pulse with the first driving pulse to apply the second driving pulse to the driving electrodes and receiving the sensing signals from the respective sensing electrodes to transfer the sensing signals to the touch IC.

In another aspect of the present invention, there is provided a method of driving a display device with integrated touch screen, which includes a panel including a plurality of driving electrodes and a plurality of sensing electrodes, a display driver IC, and a touch IC, including: applying, by a display driver IC, a first common voltage to the driving electrodes and applying a second common voltage different from the first common voltage to the sensing electrodes, when the panel operates a display driving mode; and generating, by a touch IC, a first driving pulse and determining whether there is a touch by using a plurality of sensing signals generated by the respective sensing electrodes, and generating, by the display driver IC, a second driving pulse with the first driving pulse to apply the second driving pulse to the driving electrodes and receiving the sensing signals from the respective sensing electrodes to transfer the sensing signals to the touch IC, when the panel operates a touch driving mode.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, embodiments of the present invention will be described in detail with reference to the accompanying drawings.

In the following description, for convenience of a description, a display device with integrated touch screen according to embodiments of the present invention will be exemplarily described as being an LCD device, but the present invention is not limited thereto. The present invention may be applied to various display devices such as FEDs, PDPs, ELDs, and EPDs. Also, a description on the general configuration of an LCD device is not provided.

Figure 1:
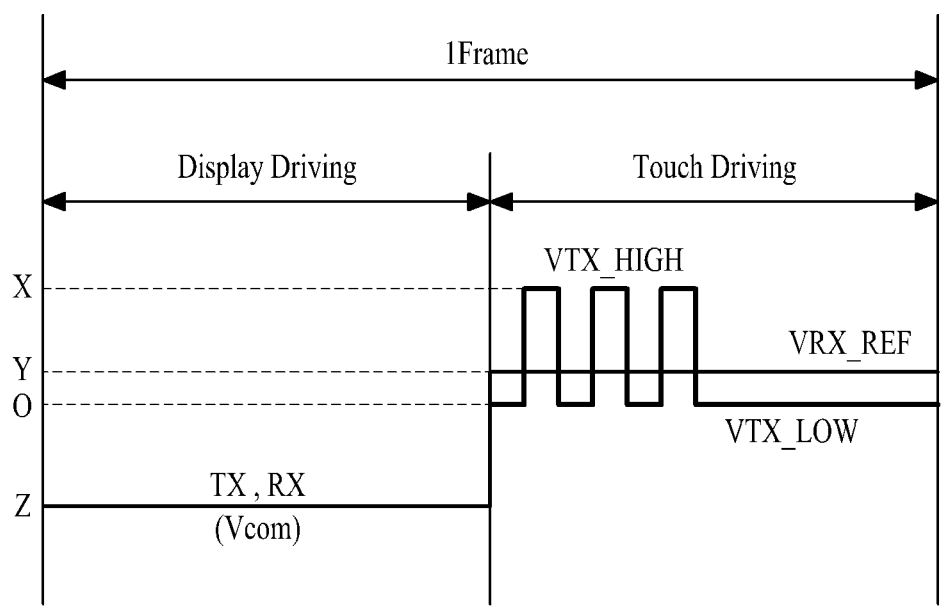
FIG. 1 is a timing chart showing voltages which are respectively applied to a driving electrode and sensing electrode of a related art display device with integrated touch screen.
Figure 2:
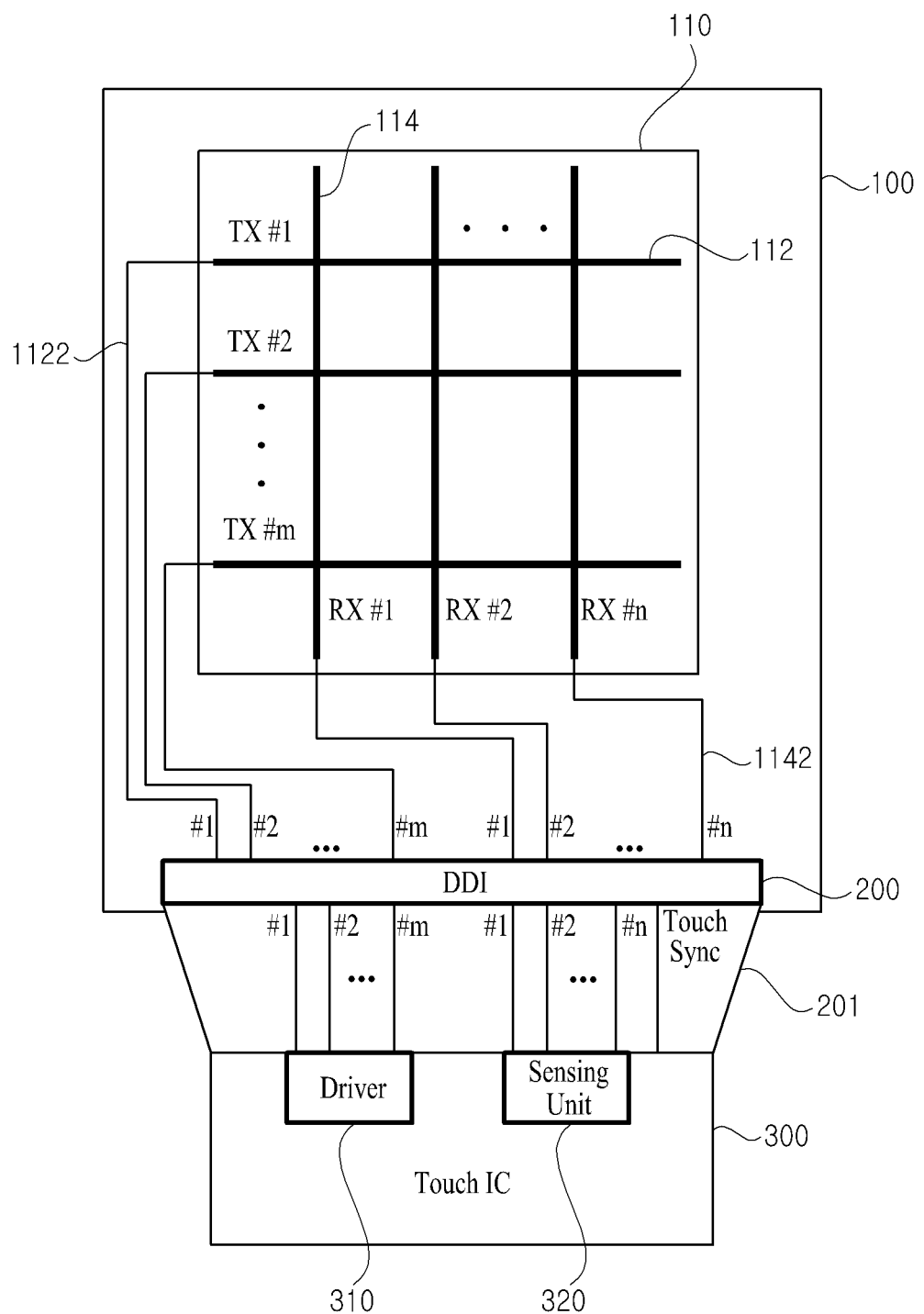
FIG. 2 is a diagram schematically illustrating a configuration of a display device with integrated touch screen according to embodiments of the present invention.

FIG. 2 is a diagram schematically illustrating a configuration of a display device with integrated touch screen according to embodiments of the present invention.

As illustrated in FIG. 2, the display device with integrated touch screen includes a panel 100, a display driver IC 200, and a touch IC 300.

The touch screen 110 is built in the panel 100, and the touch screen 110 includes a plurality of driving electrodes 112 and a plurality of sensing electrodes 114.

The respective driving electrodes 112 may be connected to the display driver IC 200 through a plurality of driving electrode lines 1122, and the respective sensing electrodes 114 may be connected to the display driver IC 200 through a plurality of sensing electrode lines 1142.

For example, when the display device with integrated touch screen is driven in a display driving mode, the driving electrodes 112 and the sensing electrodes 114 may perform the function of a common electrode. However, when the display device with integrated touch screen is driven in a touch driving mode, the driving electrodes 112 may perform the function of a touch driving electrode, and the sensing electrodes 114 may perform the function of a touch sensing electrode.

In other words, the driving electrodes and sensing electrodes of the display device with integrated touch screen according to embodiments of the present invention may act as common electrodes, and moreover may perform a touch-electrode function as well as a display-electrode function.

In an embodiment, the driving electrodes 112 may be formed parallelly in a width direction that is the direction of a gate line (not shown) in the panel 100. Each of the sensing electrodes 114 may be disposed between adjacent sub driving electrodes among a plurality of sub driving electrodes (not shown), and formed parallelly in a height direction that is the direction of a data line (not shown) in the panel 100.

For example, as illustrated in FIG. 2, the driving electrodes 112 may include first to mth driving electrodes TX #1 to TX #m, and each of the driving electrodes 112 may include n+1 number of sub driving electrodes (not shown). Also, the sensing electrodes 114 may include first to nth sensing electrodes RX #1 to RX #n. In order to configure one driving electrode, the sub driving electrodes (not shown) may be electrically connected to a plurality of driving electrode connection lines, respectively.

Each of the driving electrodes 112 may be formed as a plurality of block-type common electrodes that are formed to be overlapped with a plurality of unit pixel areas, and each of the sensing electrodes 114 may be formed as one block-type common electrode that is formed to be overlapped with the unit pixel areas.

The driving electrodes 112 and the sensing electrodes 114 need to act as common electrodes for driving liquid crystal, and thus may be formed of a transparent material such as indium tin oxide (ITO).

When the panel 100 operates in the touch driving mode, the display driver IC 200 generates a second driving pulse with a first driving pulse generated by the touch IC 300 to supply the second driving pulse to the driving electrodes 112, and receives a plurality of sensing signals from the respective sensing electrodes 114 to transfer the sensing signals to the touch IC 300. Also, when the panel 100 operates in the display driving mode, the display driver IC 200 generates a first common voltage Vcom_TX to apply the first common voltage to the driving electrodes 112, and generates a second common voltage Vcom_RX to apply the second common voltage to the sensing electrodes 114.

For example, the display driver IC 200 may make the first and second common voltages Vcom_TX and Vcom_RX different, and apply the first and second common voltages Vcom_TX and Vcom_RX to the driving electrodes 112 and the sensing electrodes 114, respectively.

As a result, since the size and direction of each of the driving electrodes differ from those of each of the sensing electrodes, the display driver IC 200 applies different common voltages to the driving electrode and the sensing electrode so as to prevent block dim caused by a luminance difference between a driving electrode block and a sensing electrode block.

Moreover, the display driver IC 200 generates a gate control signal and a data control signal with a timing signal transmitted from an external system and realigns input video data signals to be matched with the pixel structure of the panel 100, for outputting an image through the panel 100.

To this end, the display driver IC 200 may further include a gate driver that applies a scan signal to a gate line, a data driver that applies an image data signal to a data line, and a controller that controls the elements.

The touch IC 300 generates a driving pulse to apply the driving pulse to the display driver IC 200, and receives a sensing signal from the display driver IC 200 to determine whether there is a touch.

To this end, the touch IC 300 includes a driver 310 and a sensing unit 320. Here, the touch IC 300 may be connected to the display driver IC 200 through a flexible printed circuit board (FPCB) 201.

The driver 310 generates the driving pulse to apply the driving pulse to the display driver IC 200, and receives a sensing signal from the display driver IC 200 to determine whether there is a touch. Also, a touch sensing reference voltage VRX_REF is applied to the sensing unit 320, and the touch sensing reference voltage VRX_REF is substantially applied to a sensing electrode by an operational amplifier included in the sensing unit 320.

Therefore, the touch IC 300 determines whether there is a touch, with the shift of a voltage by the change in a capacitance between a driving electrode and a sensing electrode with respect to the touch sensing reference voltage VRX_REF.

In an embodiment, the touch sensing reference voltage VRX_REF having the same level as that of the minimum voltage of the second driving pulse may be applied to the sensing unit 320. As a result, when the touch sensing reference voltage VRX_REF having the same level as that of the minimum voltage of the second driving pulse is applied to the sensing unit 320, a voltage having the same level as that of the minimum voltage of the second driving pulse is applied to a sensing electrode.

For example, during a most portion of the touch driving mode section, the level of the minimum voltage of the second driving pulse applied to each driving electrode may be equal to that of the touch sensing reference voltage VRX_REF applied to each sensing electrode.

Accordingly, according to embodiments of the present invention, the same voltage is applied to the common electrode block used as the driving electrode and the common electrode block used as the sensing electrode during a most portion of the touch driving mode section, thus preventing block dim in which a luminance difference between the electrode blocks occurs in the panel.

Hereinafter, the display driver IC 200 and the touch IC 300 will be described in detail with reference to FIGS. 3 and 4.

Figure 3:
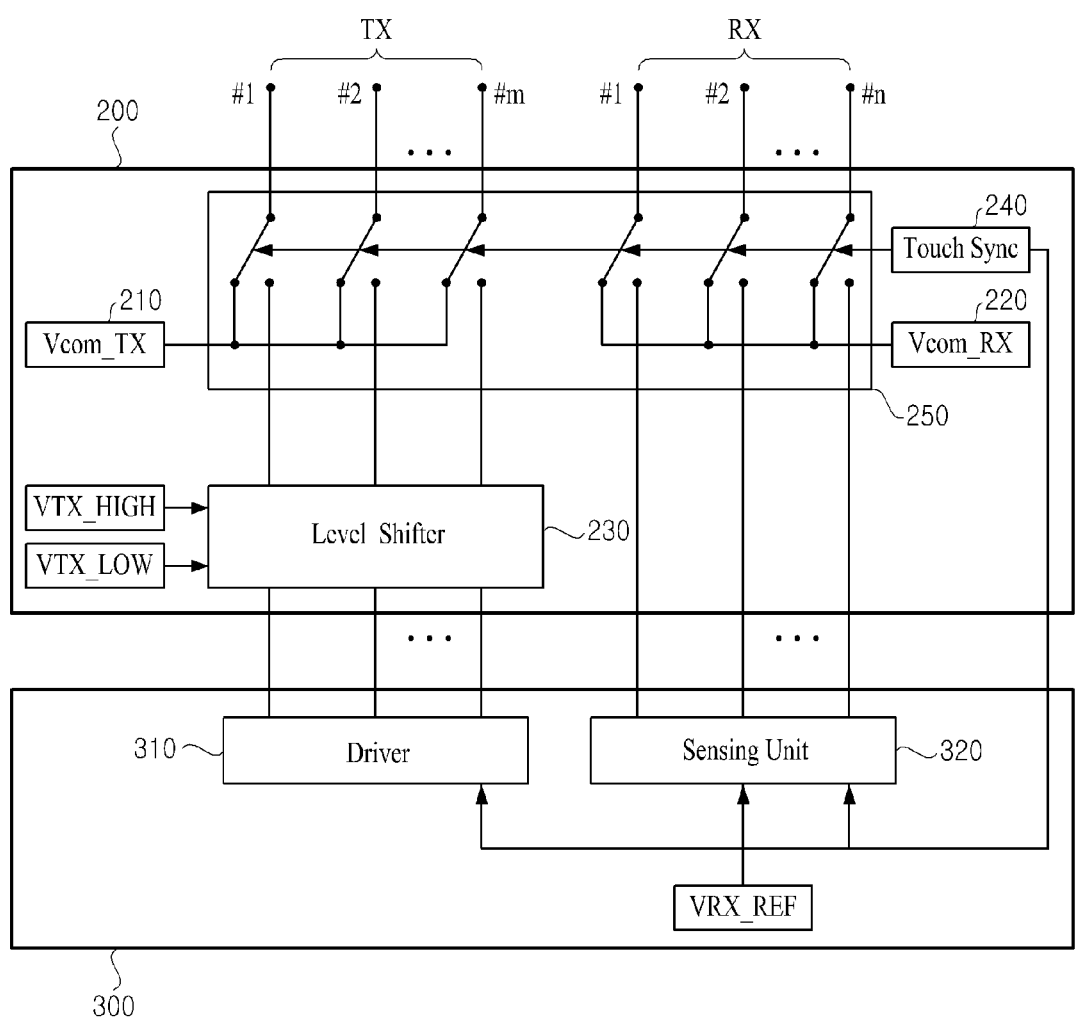
FIG. 3 is a diagram schematically illustrating a configuration of each of a display driver IC and a touch IC according to embodiments of the present invention.

FIG. 3 is a diagram schematically illustrating a configuration of each of the display driver IC and touch IC according to embodiments of the present invention. FIG. 4 is a diagram illustrating a detailed configuration of the common voltage generator of FIG. 3.

The display driver IC 200, as illustrated in FIG. 3, may include first and second common voltage generators 210 and 220, a driving pulse generator 230, a sync signal generator 240, and a switching unit 250.

The first and second common voltage generators 210 and 220 generate a common voltage Vcom for driving liquid crystal, and output the common voltage Vcom to the switching unit 250.

For example, the first common voltage generator 210 may generate the first common voltage Vcom_TX applied to each driving electrode, and the second common voltage generator 220 may generate the second common voltage Vcom_RX applied to each sensing electrode.

Figure 4:
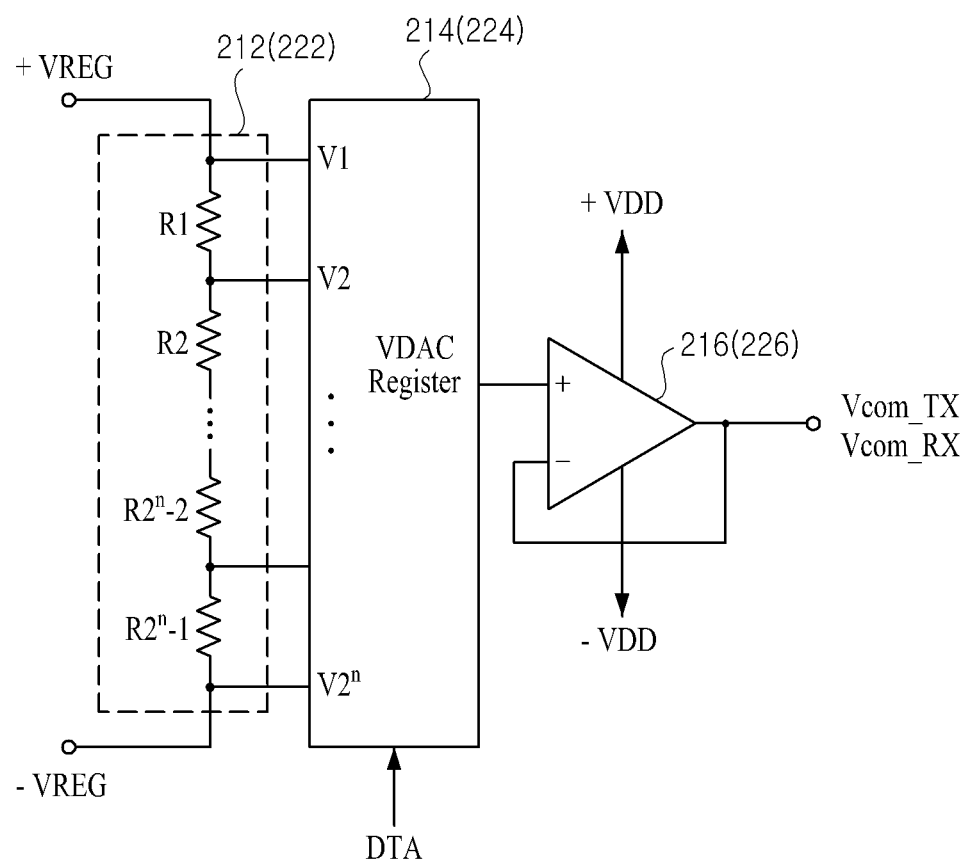
FIG. 4 is a diagram illustrating a detailed configuration of a common voltage generator of FIG. 3.

Specifically, as illustrated in FIG. 4, each of the first and second common voltage generators 210 and 220 includes a resistor string 212[222], a voltage data analog converter (VDAC) register 214[224], and a buffer 216[226].

When it is assumed that the number of bits of digital data DTA input to the VDAC register 212[222] is n number, the resistor string 212[222] include $2^n-1$ number of resistors R1 to $R(2^n-1)$ that are arranged in one row, and the maximum-level voltage +VREG and the minimum-level voltage −VREG are respectively applied to both ends of the resistor string 212[222].

Respective voltages V1 to $V2^n$ between the resistors R1 to $R(2^n-1)$ may be voltages between the maximum-level voltage +VREG and the minimum-level voltage −VREG.

The VDAC resister 214[224] receives the digital data DTA, selects a voltage corresponding to the received digital data DTA from among the respective voltages V1 to $V2^n$ between the resistors R1 to $R(2^n-1)$ of the resistor string 212[222], and outputs the selected voltage.

The buffer 216[226] outputs the voltage selected by the VDAC register 214[224] as an analog voltage, and specifically, outputs the selected voltage as the first or second common voltage Vcom_TX or Vcom_RX between source voltages +VDD and −VDD applied thereto.

In other words, each of the first and second common voltage generators 210 and 220 may change the digital data DTA input to the VDAC register 214[224] included in the display driver IC 200, thereby differently setting and generating the first and second common voltages Vcom_TX and Vcom_RX.

Referring again to FIG. 3, the driving pulse generator 230 generates the second driving pulse with the first driving pulse generated by the driver 310 of the touch IC 300.

For example, the driving pulse generator 230 may be a level shifter for shifting a voltage, and may change the first driving pulse to the second driving pulse so as to become the maximum voltage VTX_HIGH and minimum voltage VTX_LOW of the second pulse in a maximum-value section and minimum-value section of the first driving pulse.

Moreover, when the panel 100 operates in the touch driving mode, to prevent block dim caused by a voltage difference between a driving electrode and a sensing electrode, the minimum voltage VTX_LOW of the second driving pulse may have a voltage the same level as that of the touch sensing reference voltage VRX_REF applied to the sensing unit 320 of the touch IC 300.

The sync signal generator 240 generates a sync signal indicating a driving mode of the panel 100. Here, the sync signal (Touch Sync) may include a first sync signal indicating the display driving mode and a second sync signal indicating the touch driving mode.

For example, during an image output section in which the panel 100 operates in the display driving mode, the sync signal generator 240 may generate the first sync signal indicating the display driving mode, and output the first sync signal to the switching unit 250 and the touch IC 300. Also, during a touch sensing section in which the panel 100 operates in the touch driving mode, the sync signal generator 240 may generate the second sync signal indicating the touch driving mode, and output the second sync signal to the switching unit 250 and the touch IC 300.

When the first sync signal is input, the switching unit 250 connects the first common voltage generator 210 to the plurality of driving electrodes, and connects the second common voltage generator 220 to the plurality of sensing electrodes, thereby applying the first common voltage Vcom_TX to the driving electrodes and applying the second common voltage Vcom_RX to the sensing electrodes. Also, when the second sync signal is input, the switching unit 250 connects the driving pulse generator (level shifter) 230 to the plurality of driving electrodes, and connects the sensing unit 320 of the touch IC 300 to the plurality of sensing electrodes, thereby applying the second driving pulse to the driving electrodes and receiving a plurality of sensing signals from the respective sensing electrodes.

In the touch IC 300, as illustrated in FIG. 3, the driver 310 generates the first driving pulse to output the first driving pulse to the driving pulse generator 230, and the touch sensing reference voltage VRX_REF is applied to the sensing unit 320.

Moreover, the touch sensing reference voltage VRX_REF applied to the sensing unit 320 may have a voltage the same level as that of the minimum voltage VTX_LOW of the second driving pulse.

For example, the minimum voltage VTX_LOW of the second driving pulse generated by the display driver IC 200 may be applied as the touch sensing reference voltage to the sensing unit 320 of the touch IC 300, or the touch sensing reference voltage VRX_REF generated by the touch IC 300 may be applied as the minimum voltage of the second driving pulse to the driving pulse generator 230. Also, as illustrated in FIG. 3, the touch sensing reference voltage VRX_REF and the minimum voltage VTX_LOW of the second driving pulse which have the same level may be separately generated by the touch IC 300 and the display driver IC 200, respectively.

The sync signal generated by the sync signal generator 240 of the display driver IC 200 is applied to the driver 310 and sensing unit 320, which operate according to the sync signal generated by the sync signal generator 240 of the display driver IC 200.

For example, when the second sync signal indicating the touch driving mode is input, the driver 310 may generate the first driving pulse to output the first driving pulse to the driving pulse generator 230 of the display driver IC 200, and the sensing unit 320 may receive a plurality of sensing signals from the display driver IC 200 to determine whether there is a touch.

The sensing unit 320 may include an operational amplifier (not shown) and an analog-digital converter (ADC, not shown) which correspond to each of the plurality of sensing electrodes 114.

For example, the operational amplifier (not shown) may include a non-inverting input terminal receiving the touch sensing reference voltage VRX_REF, an inverting input terminal connected to one of the sensing electrodes, and an output terminal connected to the ADC (not shown).

Specifically, when the touch sensing reference voltage VRX_REF is applied to the non-inverting input terminal of the operational amplifier (not shown), the inverting input terminal and the non-inverting input terminal need to form a virtual ground in operating characteristic of the operational amplifier, and thus, the touch sensing reference voltage VRX_REF is substantially applied to the sensing electrodes 114.

Therefore, when the touch sensing reference voltage VRX_REF has the same level as that of the minimum voltage VTX_LOW of the second driving pulse, the minimum voltage VTX_LOW of the second driving pulse is applied to the inverting input terminal of the operational amplifier (not shown), and the minimum voltage VTX_LOW of the second driving pulse is substantially applied to the sensing electrodes 114.

Furthermore, although the driving electrode 112 is not electrically connected to the sensing electrode 114, a mutual capacitance between the driving electrode 112 and the sensing electrode 114 is changed by the driving pulse applied to the driving electrode 112. The operational amplifier (not shown) may integrate the changed mutual capacitance to output the integrated result as a voltage to the ADC (not shown), or transfer the changed mutual capacitance as a voltage to the ADC (not shown).

The ADC (not shown) converts a voltage, output from the operational amplifier, into a digital code. Also, the sensing unit 320 may include a touch analyzer (not shown) that analyzes the changed mutual capacitance output from the ADC (not shown) to determine whether there is a touch.

As noted above, the display device with integrated touch screen according to embodiments of the present invention may use the minimum voltage VTX_LOW of the second driving pulse and the touch sensing reference voltage VRX_REF and which have the same level.

For example, when the minimum voltage VTX_LOW of the second driving pulse uses a ground voltage and the touch sensing reference voltage VRX_REF uses a positive DC voltage having a constant level, the display device with integrated touch screen according to embodiments of the present invention needs to use a voltage having the same level with respect to one voltage, for making the levels of the voltages equal. Accordingly, other voltages may be changed with respect to the minimum voltage VTX_LOW of the second driving pulse and the touch sensing reference voltage VRX_REF.

Hereinafter, embodiments in which other voltages are changed with respect to each voltage will be described in detail with reference to FIGS. 5, 6, 7 and 8.

FIGS. 5, 6, 7 and 8 are timing charts showing voltages which are applied to a driving electrode and sensing electrode of the display device with integrated touch screen according to embodiments of the present invention, respectively.

Figure 5:
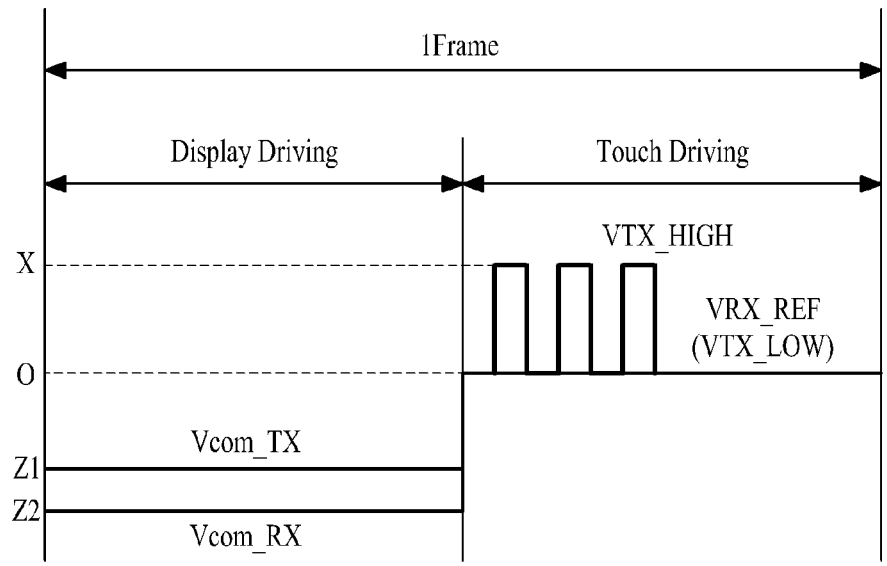
FIGS. 5, 6, 7 and 8 are timing charts showing voltages which are applied to a driving electrode and sensing electrode of the display device with integrated touch screen according to embodiments of the present invention, respectively.
Figure 6:
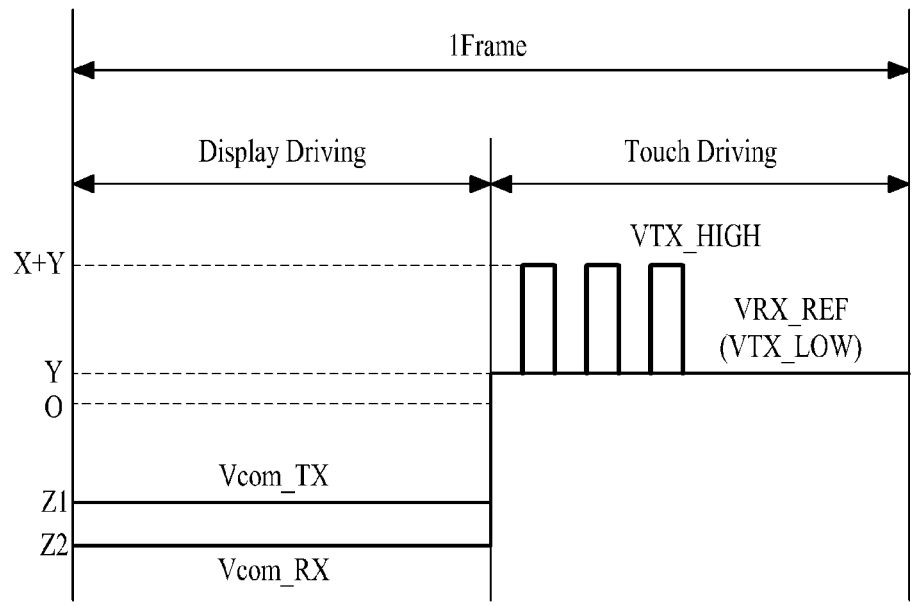
Figure 7:
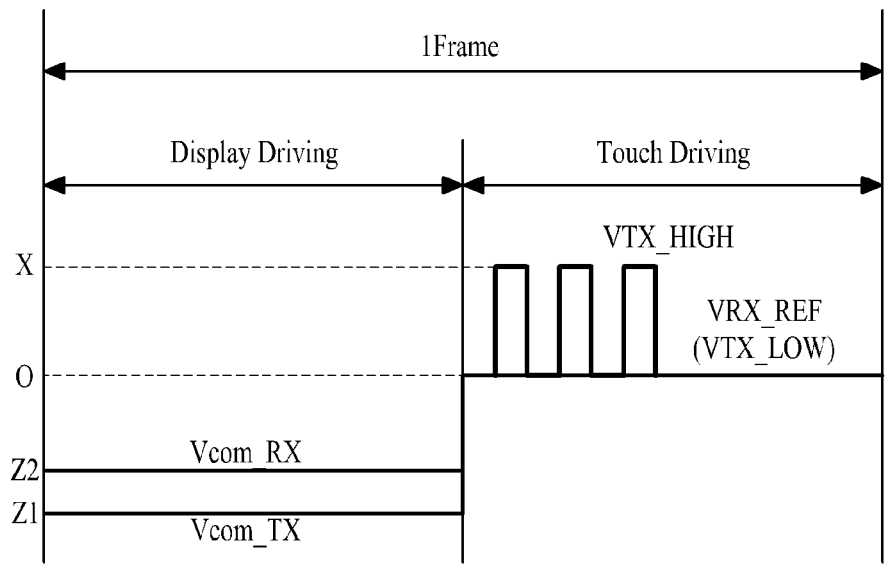
Figure 8:
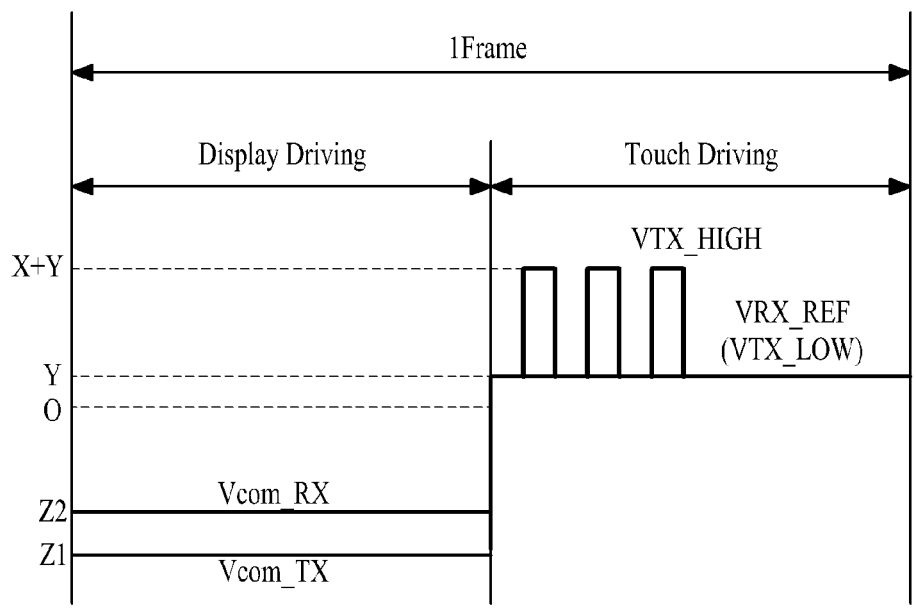

Especially, FIGS. 5 and 7 are a diagram showing voltages which are applied with respect to the minimum voltage of the second driving pulse which is the ground voltage. FIGS. 6 and 8 are a diagram showing voltages which are applied with respect to the touch sensing reference voltage VRX_REF which is a positive DC voltage.

Here, a driving electrode TX and a sensing electrode RX that are built in the panel 100 perform the function of a common electrode and the function of a touch electrode, and thus, the display device with integrated touch screen according to embodiments of the present invention divides time and performs time-division driving according to the display driving mode and the touch driving mode.

Therefore, as shown in FIGS. 5, 6, 7 and 8, one frame in time-division driving may be divided into the display driving mode section (in which the panel 100 operates in the display driving mode according to the sync signal) and the touch driving mode section (in which the panel 100 operates in the touch driving mode according to the sync signal). In this case, touch driving is turned off in the display driving mode section, and display driving is turned off in the touch driving mode section, thus minimizing signal interference between the display driving mode section and the touch driving mode section.

First, as shown in FIGS. 5, 6, 7 and 8, during the display driving mode section, different first and second common voltages Vcom_TX and Vcom_RX may be respectively applied to each driving electrode and each sensing electrode.

Therefore, in a panel, the sizes and directions of the driving electrode and sensing electrode formed in the panel 100 differ, and thus, when a common voltage having the same level is applied to the driving electrode and the sensing electrode, block dim is caused by a luminance difference between the driving electrode block and the sensing electrode block.

Accordingly, in the display device with integrated touch screen according to the embodiments of the present invention, by differently setting and supplying common voltages which are respectively applied to the driving electrode and the sensing electrode during the display driving mode section, block dim appearing between electrode blocks can be prevented.

Subsequently, during the touch driving mode section, as shown in FIGS. 5 and 7, when the minimum voltage of the second driving pulse is the ground voltage of 0(V), the second driving pulse having the minimum voltage VTX_LOW of 0(V) is applied to a driving electrode TX, and the touch sensing reference voltage VRX_REF of 0(V) is applied to a sensing electrode RX.

Moreover, as shown in FIGS. 6 and 8, when the touch sensing reference voltage VRX_REF is a positive DC voltage of Y(V), the second driving pulse having the minimum voltage VTX_LOW of Y(V) is applied to the driving electrode TX, and the touch sensing reference voltage VRX_REF of Y(V) is applied to the sensing electrode RX.

Accordingly, in the display device with integrated touch screen according to the embodiments of the present invention, by setting the minimum voltage VTX_LOW of the second driving pulse and the touch sensing reference voltage VRX_REF to the same level during the touch driving mode section, block dim caused by a difference between voltages applied to the driving electrode and the sensing electrode can be prevented.

As described above, according to the embodiments of the present invention, by differently setting and supplying common voltages which are respectively applied to the driving electrode and the sensing electrode during the display driving mode section, block dim appearing between electrode blocks can be prevented.

Moreover, according to the embodiments of the present invention, by setting the minimum voltage of the second driving pulse and the touch sensing reference voltage to the same level during the touch driving mode section, block dim caused by a difference between voltages applied to the driving electrode and the sensing electrode can be prevented.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device with integrated touch screen, comprising:
   a panel comprising a plurality of driving electrodes and a plurality of sensing electrodes;
   a touch IC generating a first driving pulse, and determining whether there is a touch by using a plurality of sensing signals generated by the respective sensing electrodes; and a display driver IC applying a first common voltage to the driving electrodes and applying a second common voltage different from the first common voltage to the sensing electrodes when the panel operates a display driving mode and, when the panel operates a touch driving mode, generating a second driving pulse with the first driving pulse to apply the second driving pulse to the driving electrodes and receiving the sensing signals from the respective sensing electrodes to transfer the sensing signals to the touch IC,
   wherein the first common voltage has a first constant voltage level and the second common voltage has a second constant voltage level different from the first constant voltage level,
   wherein the touch IC comprises a sensing unit sensing the touch, a touch sensing reference voltage applied to the sensing unit being equal to a minimum voltage of the second driving pulse,
   wherein the sensing unit comprises a plurality of operational amplifiers comprising a non-inverting input terminal, to which the touch sensing reference voltage is applied, and an inverting input terminal connected to one of the sensing electrodes.

2. The display device of claim 1, wherein the display driver IC comprises:
   a first common voltage generator generating the first common voltage; and
   a second common voltage generator generating the second common voltage.

3. The display device of claim 1, wherein the display driver IC comprises:
   a driving pulse generator generating the second driving pulse with the first driving pulse; and
   a switching unit allowing the first and second common voltages to respectively be applied to the driving electrodes and the sensing electrodes according to a first sync signal indicating the display driving mode, and connecting the driving electrodes to the driving pulse generator and connecting the sensing electrodes to the touch IC according to a second sync signal indicating the touch driving mode.

4. The display device of claim 3, wherein,
the driving pulse generator generates the second driving pulse having a high-level maximum voltage and a low-level minimum voltage with the first driving pulse, and
a level of the low-level minimum voltage is equal to the touch sensing reference voltage.

5. A method of driving a display device with integrated touch screen, which includes a panel including a plurality of driving electrodes and a plurality of sensing electrodes, a display driver IC, and a touch IC, the method comprising:
applying, by the display driver IC, a first common voltage to the driving electrodes and applying a second common voltage different from the first common voltage to the sensing electrodes, when the panel operates a display driving mode; and
generating, by the touch IC, a first driving pulse and determining whether there is a touch by using a plurality of sensing signals generated by the respective sensing electrodes, and generating, by the display driver IC, a second driving pulse with the first driving pulse to apply the second driving pulse to the driving electrodes and receiving the sensing signals from the respective sensing electrodes to transfer the sensing signals to the touch IC, when the panel operates a touch driving mode,
wherein the first common voltage has a first constant voltage level and the second common voltage has a second constant voltage level different from the first constant voltage level,
wherein the touch IC comprises a sensing unit sensing the touch, a touch sensing reference voltage applied to the sensing unit being equal to a minimum voltage of the second driving pulse,
wherein the sensing unit comprises a plurality of operational amplifiers comprising a non-inverting input terminal, to which the touch sensing reference voltage is applied, and an inverting input terminal connected to one of the sensing electrodes.

6. The method of claim 5, wherein the display driver IC comprises:
a first common voltage generator generating the first common voltage; and
a second common voltage generator generating the second common voltage.

7. The method of claim 5, wherein the display driver IC comprises:
a driving pulse generator generating the second driving pulse with the first driving pulse; and
a switching unit allowing the first and second common voltages to respectively be applied to the driving electrodes and the sensing electrodes according to a first sync signal indicating the display driving mode, and connecting the driving electrodes to the driving pulse generator and connecting the sensing electrodes to the touch IC according to a second sync signal indicating the touch driving mode.

8. The method of claim 7, wherein the driving pulse generator generates the second driving pulse having a high-level maximum voltage and a low-level minimum voltage with the first driving pulse, and a level of the low-level minimum voltage is equal to the touch sensing reference voltage.

* * * * *